Feb. 27, 1951  LE ROY. V. JONES  2,543,027
METHOD OF MAKING CRINKLED FIBERS
Filed Sept. 18, 1948
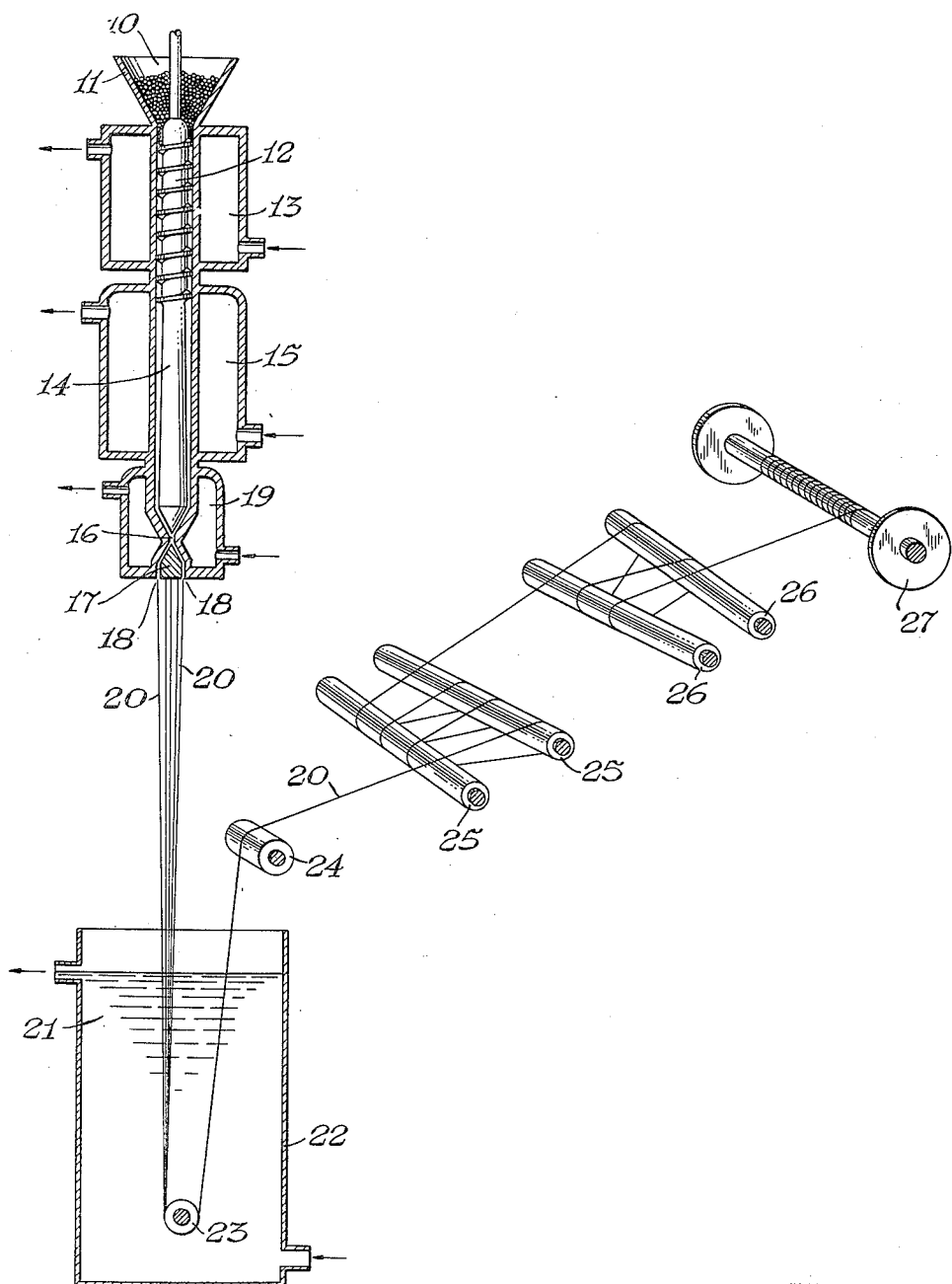
INVENTOR.
Le Roy V. Jones
BY
Griswold & Burdick
ATTORNEYS Patented Feb. 27, 1951

2,543,027

UNITED STATES PATENT OFFICE 2,543,027

METHOD OF MAKING CRINKLED FIBERS

Le Roy V. Jones, Midland, Mich., assignor to The Dow Chemical Company, Midland, Mich., a corporation of Delaware Application September 18, 1948, Serial No. 49,908

2 Claims. (Cl. 18—54)

This invention relates to a method of making crinkled fibers from extrudable organic thermoplastics. It relates in particular to such a method applicable to the normally crystalline sarans.

Ever since the commercial advent of synthetic filaments, attempts have been made to provide them in crinkled form to simulate wool and some of the other natural fibers. The principal methods employed for that purpose depend on chemical treatment of the filaments. Other methods have been proposed which relay on physical means to establish localized stresses in the filaments and thus to effect crinkling. Such aftertreatments may be effective for the intended purpose, but it would be preferable to be able to produce a crinkled filament directly from the extrusion operation. This is especially desirable when it is intended to produce crinkled filaments from the normally crystalline sarans (polymers and copolymers of vinylidene chloride, which have crystalline X-ray diffraction patterns), since these polymers are especially insensitive to chemical agents and many types of surface treatment which are effective with many synthetic fibers have no crinkle-producing effect on a crystalline saran.

It is an object of the present invention to provide an extrusion method whereby extrudable organic thermoplastics may be formed into crinkled filaments or fibers. A particular object is to provide such a method whereby a normally crystalline saran may be extruded to provide a crinkled filament. Another object is to provide a method of making crinkled fibers from extrudable organic thermoplastics wherein the predisposition of the extruded filament to crinkle is due entirely to conditions within the extrusion apparatus.

I have found that these objects may be attained, and that the only change which may be required in a conventional plastics extruder in order to carry out the new method is the provision of means for maintaining different temperatures in the main extruder barrel and in the last inch or two before the spinneret orifices. The invention consists in heating the thermoplastic material in an extruder to a temperature from 5 to 20 centigrade degrees above the melting point or normal extrusion temperature of the plastic, then advancing the fluid plastic in fine streams through a zone maintained at a temperature from 5 to 20 degrees below the melting or normal extrusion temperature and from 15 to 25 degrees below the temperature in the first said zone, thence through spinneret orifices into the atmosphere where the extruded filaments are cooled, stretched and reeled in normal manner. When released from the winding reel, the filaments are found to be crinkled, the degree of curl varying from tight kinks to gentle waves, depending on the particular temperatures used in the two critical zones in the extruder.

As applied to a normally crystalline saran, the method comprises feeding a powdered or granular form of such a polymer into the barrel of a screw conveyor, advancing and compacting the feed in the screw before subjecting it to a fusion temperature, passing the fused polymer composition in a thin stream over a torpedo head attached to the feed screw while holding the saran temperature from 5 to 20 degrees above its melting point, advancing the fluid saran through an adapter and to the fine extrusion orifices while its temperature is reduced from 15 to 25 degrees to a value from 5 to 20 degrees below the melting point, extruding the so-prepared saran in fine filamentary form downwardly through air at room temperature for a distance of 5 to 30 inches into a liquid bath at a supercooling temperature between 10° and 60° C., and preferably near 25° C., and stretching the supercooled filaments, usually from 1.5 to 3.5 times their original length, to effect crystallization and orientation. The product has the desired crinkled effect.

The method of the invention, as applied to the making of crinkled saran fibers, will be described more fully with reference to the accompanying drawing, the single figure of which is a view of the extrusion apparatus, partially in section, together with the appurtenant supercooling bath and stretching rolls.

The normally crystalline saran polymer 10 is fed in granular or coarse powdered form from the hopper 11 to the screw 12 (driven by means not shown) of a vertical extruder wherein it is compacted and advanced at a temperature of 25° to 100° C., and preferably near 40° C. The temperature in the screw section of the extruder is controlled by water flowing through the extruder jacket 13, and is always below the softening point of the polymeric feed 10. From screw 12, the polymer 10 is advanced in a thin layer over a torpedo 14, continuous with the screw 12, which rotates in a section of the extruder heated by steam in jacket 15 to a temperature from 5 to 20 centigrade degrees above the melting point and normal extrusion temperature of the polymer. In the course of its travel beyond torpedo 14, the molten polymer passes through constricted throat 16 and is divided at the extrusion head 17 into a plurality of fine streams and extruded through spinneret orifices 18. The entire section of the extruder beyond torpedo 14 is held at a temperature which is from 15 to 25 degrees lower than that in the torpedo section and is at least 5 degrees and not over 20 degrees below the melting point of the crystalline saran. This temperature control is effected through separate jacket 19 for steam or other heat transfer fluid. The extruded filaments 20 fall through air a distance of from 5 to 30 inches into water or other inert liquid 21 which is at a temperature between 10° and 60° C., and preferably near 25° C. The filaments 20 are conveyed through liquid 21 in vessel 22 for a time (usually of the order of 2 to 15 seconds) sufficient to supercool the temporarily non-crystalline saran, and are then removed from the bath over suitably positioned guide rolls 23 and 24 and are passed several times around snubbing rolls 25 which prevent transmission of the tension applied beyond rolls 25 back to the orifices 18. From snubbing rolls 25, the filaments 20 are passed several times around stretching rolls 26, which are driven at a peripheral speed from 1.5 to 3.5 or 4 times that of rolls 25, to effect stretching and recrystallization of the saran between the two sets of rolls. The stretched filaments 20 are found to have a definite crinkle, and may be wound on drum 27 for storage, or they may be passed directly to a cutter, not shown, to be chopped into suitable short staple lengths for spinning into yarn by known methods.

The degree of kink or curl in the extruded and stretched filaments depends upon the amount of stretching which the filaments undergo between the orifices 18 and the storage drum 27, and the existence of a kink or curl as the direct result of extrusion and not of any after-treatment depends upon the careful control of the temperatures in the sections of the extruder surrounded by jackets 15 and 19. This may be illustrated in the following Table I. The polymer composition used in the examples shown in the table consisted of 91 per cent of a crystalline copolymer of about 90 per cent vinylidene chloride and 10 per cent vinyl chloride, plasticized with 7 per cent di-(alpha-phenylethyl) ether and 2 per cent dibutyl phthalate. It had a melting point and normal extrusion temperature of 168° C. The speed of the snubbing rolls 25 (rate of take-away from the extrusion orifice) was between 118 and 130 feet per minute, while that of stretching rolls 26 was 350 to 390 feet per minute, and the temperature of the supercooling bath, in which the filaments remained for 2 seconds, was 35° C. The 30 extrusion orifices 18 were each 0.018 inch in diameter and were disposed in a circle 0.5 inch in diameter in the extrusion head. Other significant factors are reported in the table.

Table I

| Temperature in Jacket, °C. | | | Extrusion Rate, g./min. | Distance Orifice to Bath, Inches | Curl |
|---|---|---|---|---|---|
| No. 13 | No. 15 | No. 19 | | | |
| 70 | 187 | 160 | 12.3 | 15 | Kinky. |
| 70 | 185 | 165 | 11.2 | 15 | None. |
| 70 | 185 | 164 | 11.2 | 15 | Do. |
| 75 | 187 | 158 | 11.2 | 15 | Kinky. |
| 75 | 187 | 162 | 11.2 | 15 | Wavy. |
| 80 | 187 | 162 | 8.7 | 15 | Do. |
| 75 | 187 | 162 | 8.7 | 6 | Slightly Wavy. |
| 75 | 187 | 162 | 13.4 | 30 | Very wavy. |

It is seen that, when the temperature in the extrusion head (jacket No. 19) is within 5 degrees of the melting point, the product is not kinked or curled.

The following Table II illustrates more fully the critical temperature limits. The composition used was similar to that reported in Table I, except that more plasticizer was present and the melting point was 160° C. The extrusion rate was held constant at 13 grams per minute, and the extrusion orifice was 24 inches from the supercooling bath. The peripheral speed of rolls 25 was about 240 feet per minute, and that of stretching rolls 26 was about 750 feet per minute.

Table II

| Temperature in Jacket, °C. | | | Appearance of Product |
|---|---|---|---|
| No. 13 | No. 15 | No. 19 | |
| 40 | 171 | 153 | Very curly. |
| 40 | 171 | 158 | Very slight waviness. |
| 40 | 171 | 163 | No curl. |
| 40 | 171 | 168 | Do. |
| 40 | 171 | 173 | Do. |
| 40 | 171 | 177 | Do. |
| 40 | 178 | 153 | Very slight waviness. |
| 40 | 181 | 153 | No curl. |
| 40 | 186 | 153 | Do. |
| 40 | 189 | 153 | Do. |

From the foregoing data, several factors are seen to be important. Thus, if the temperature in the extrusion head is within 5 degrees below the melting point, or if it is above the melting point, no crinkle is obtained in the extruded filament. Similarly, if the temperature in the torpedo zone is 20 or more degrees above the melting point, no curl is obtained. Finally, if the temperature in the torpedo zone exceeds that in the extrusion head by more than 25 degrees, there is none of the desired effect in the filamentary product.

The same principles were found to apply when each of several different crystalline sarans, in the form of extrudable compositions, was used in place of those reported in the foregoing tables. When suitably plasticized to be extrudable, the polymer of vinylidene chloride alone and all of its thermoplastic crystalline copolymers could be formed into crinkled filaments from which staple fibers for yarn production could be made. In all of the crinkled filaments produced from crystalline sarans, the crinkles are unaffected by laundering and dry cleaning operations, and the present method is one for producing permanently crinkled filaments directly by extrusion, without any special surface treatment of the extruded filaments.

The term "crinkled" herein employed is intended to cover that condition of the filaments, which is variously referred to in the art by such terms as crimped, kinked, curled, and "wool-like."

I claim:

1. The method which comprises heating an extrudable normally crystalline saran in extrusion apparatus to a temperature from 5 to 20 centigrade degrees above its melting point, then, while advancing the saran toward an extrusion orifice, cooling the saran from 15 to 25 degrees to a temperature 5 to 20 degrees below its melting point, extruding the saran in the form of filaments at the said lower temperature, and supercooling and stretching the filaments, to obtain a filamentary product having a natural crinkle.

2. The method which comprises supplying an extrudable normally crystalline saran continuously to a zone in which it is heated to a temperature from 5 to 20 centigrade degrees above its melting point, advancing the so-heated saran continuously to another zone in which it is cooled from 15 to 25 degrees to a temperature 5 to 20 degrees below its melting point, continuously extruding the saran from the second said zone at the lower said temperature, and supercooling and stretching the filaments, to obtain a filamentary product having a natural crinkle.

LE ROY V. JONES.

REFERENCES CITED

The following references are of record in the file of this patent:

UNITED STATES PATENTS

| Number | Name | Date |
|---|---|---|
| 2,233,442 | Wiley | Mar. 4, 1941 |
| 2,296,202 | Hardy | Sept. 15, 1942 |
| 2,369,506 | Weibel | Feb. 13, 1945 |